United States Patent
Song

(10) Patent No.: US 8,489,838 B2
(45) Date of Patent: Jul. 16, 2013

(54) METHOD AND TERMINAL DEVICE FOR ERASING DATA OF TERMINAL

(75) Inventor: Yue Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 12/959,502

(22) Filed: Dec. 3, 2010

(65) Prior Publication Data

US 2011/0078403 A1    Mar. 31, 2011

Related U.S. Application Data

(63) Continuation of application No. PCT/CN2009/072107, filed on Jun. 3, 2009.

(30) Foreign Application Priority Data

Jun. 5, 2008   (CN) .......................... 2008 1 0111238
Feb. 24, 2009   (CN) .......................... 2009 1 0004290

(51) Int. Cl.
G06F 12/00    (2006.01)

(52) U.S. Cl.
USPC ........................................ 711/166

(58) Field of Classification Search
None
See application file for complete search history.

(56) References Cited

U.S. PATENT DOCUMENTS

| 6,189,016 B1 * | 2/2001 | Cabrera et al. .................. 1/1 |
| 2003/0158947 A1 * | 8/2003 | Bloch et al. .................. 709/227 |
| 2005/0228938 A1 | 10/2005 | Khare et al. |
| 2006/0041594 A1 | 2/2006 | Chang et al. |
| 2007/0093243 A1 | 4/2007 | Kapadekar et al. |
| 2007/0130185 A1 * | 6/2007 | Miller et al. .................. 707/101 |
| 2007/0239673 A1 | 10/2007 | Barsness et al. |
| 2008/0046583 A1 | 2/2008 | Rao |

FOREIGN PATENT DOCUMENTS

| CN | 1684048 A | 10/2005 |
| CN | 1737800 A | 2/2006 |
| CN | 1809186 A | 7/2006 |
| CN | 101018375 A | 8/2007 |
| CN | 10119557 A | 2/2008 |
| CN | 101159963 A | 4/2008 |
| EP | 1 705 872 | 9/2006 |
| KR | 10-2006-0127493 | 12/2006 |

OTHER PUBLICATIONS

"OMA Device Management Representation Protocol", Approved Version 1.2-09, Feb. 2007, pp. 1-47.
"OMA Device Management Security", Approved Version 1.2-09, Feb. 2007, pp. 27.
"OMA Device Management Standardized Objects", Approved Version 1.2-09, Feb. 2007, pp. 1-29.
"OMA Device Management Tree and Description Serialization", Approved 1.2-09, Feb. 2007 pp. 1-19.
"OMA Device Management Tree and Description", Approved Version 1.2-09, Feb. 2007, pp. 1-48.

(Continued)

*Primary Examiner* — Duc Doan
(74) *Attorney, Agent, or Firm* — Huawei Technologies Co., Ltd.

(57) ABSTRACT

A method for erasing data of a terminal includes: receiving a data erasing request from a management server; deleting data corresponding to an erasing range node according to a value of a flag bit of the erasing range node in an erasable list; and deleting the erasing range node from the erasable list.

16 Claims, 5 Drawing Sheets

OTHER PUBLICATIONS

"OMA Device Management Protocol", Approved Version 1.2.-09, Feb. 2007, pp. 1-53.

"OMA Device Management Notification Initiated Session", Approved Version 1.2-09, Feb. 2007, pp. 1-16.

"OMA Device Management Bootstrap", Approved Version 1.2-09, Feb. 2007, pp. 1-28.

Abstract of US 2007-239673 (A1), http:/v3.espacenet.com/publicationDetails/biblio?DB=EPODOC&adjacent . . . Sep. 10, 2010.

Chinese Office Action issued Nov. 12, 2010 in corresponding Chinese Patent Application 200910004290.6.

Korean Office Action mailed Mar. 14, 2012 issued in corresponding Korean Patent Application No. 10-2010-7029077.

International Search Report, mailed Sep. 17, 2009, in corresponding International Application No. PCT/CN2009/072107 (4 pp.).

PCT Written Opinion of the International Searching Authority mailed on Sep. 17, 2009 in corresponding PCT Application No. PCT/CN2009/072107.

European Search Report dated Jul. 20, 2011 from corresponding European Patent Application No. 09757084.0-2413.

European Office Action dated Aug. 23, 2012 issued in corresponding European Patent Application No. 09757084.0.

2nd office action issued in corresponding Chinese patent application 200910004290.6, dated Apr. 28, 2013,and English translation thereof, total 15 pages.

* cited by examiner

METHOD AND TERMINAL DEVICE FOR ERASING DATA OF TERMINAL

CROSS-REFERENCE TO RELATED APPLICATIONS

This application is a continuation of International Application No. PCT/CN2009/072107, filed on Jun. 3, 2009, which claims priority to Chinese Patent Application No. 200810111238.6, filed on Jun. 5, 2008, and Chinese Patent Application No. 200910004290.6, filed on Feb. 24, 2009, all of which are hereby incorporated by reference in their entireties.

FIELD OF THE TECHNOLOGY

The present invention relates to the field of communications technologies, and more particularly to a method and a terminal device for erasing data of a terminal.

BACKGROUND OF THE INVENTION

Open Mobile Alliance Device Management (OMA DM) V1.2 is a uniform specification for device management specified by the OMA DM working group.

A DM system provides a low-cost solution for third parties to manage and set Over The Air (OTA) terminals, such as cell phone terminals, as well as functional objects, environment and configuration information in the terminals. Problems encountered during the process of using of the network terminals are solved, the installation and the upgrading of software and firmware are performed in an OTA manner, more user-friendly and personalized services are provided, and user experience is improved. The third parties may be network management devices of information management departments of mobile operators, service providers, or cooperation partners.

In an overall structural view, a DM Agent of a terminal is configured to explain and execute management commands delivered by a DM server. A management tree stored in a terminal can be regarded as an interface used by a DM Server to manage the terminal through a DM protocol, where the terminal includes some basic Management Objects (MOs), and the DM Server controls the MOs of the terminal by operating management tree objects. Operation commands include Get, Replace, Exec, Copy, and Delete.

Based on the OMA DM technology, currently a method can provide a user with a function of erasing data stored in a terminal. When a cell phone of a user is lost, or when a second-hand trade is required, the user can erase personal data stored in the terminal through a remote server.

In the prior art, when data is being erased, a data erasing range can be indicated by a node of a management tree. In a specific method, an erasing range node is set, where the erasing range node has two functions, one function is to identify the data erasing range, such as short messages or an address list, and the other function is to set a value of a flag bit in the erasing range node, where the value of the flag bit in the erasing range node is configured to indicate whether data corresponding to the erasing range node needs to be erased when an erasing operation is executed. For example, if the value of the flag bit of the erasing range node corresponding to the short message is "True", short-message data in a terminal is erased when the data in the terminal is erased. If the value of the flag bit of the erasing range node corresponding to the short message is "False", the short-message data stored in the terminal is not erased when the data in the terminal is erased.

During the procedure of researching and practicing the prior art, the inventor of the present invention finds that in the prior art, when an erasing operation is completed, data corresponding to an erasing range node is erased, but the erasing range node in a terminal is still stored in an erasable list. In this situation, when a management server executes an erasing operation again, the terminal still deletes the data corresponding to the erasing range node according to a value of a flag bit of the erasing range node after receiving a request from the management server. Actually, the data corresponding to the erasing range node does not exist, which results in the redundant erasing operation, lowers the erasing efficiency of a system, and wastes processing resources of the system.

SUMMARY OF THE INVENTION

The present invention is directed to a method and a terminal device for erasing data of a terminal, which are capable of improving the efficiency of executing an erasing operation by a system, and saving processing resources of the system.

In an embodiment, the present invention provides a method for erasing data of a terminal, which includes the following steps.

A data erasing request from a management server is received.

Data corresponding to an erasing range node is deleted according to a value of a flag bit of the erasing range node in an erasable list.

The erasing range node is deleted from the erasable list.

In an embodiment, the present invention provides a method for erasing data of a terminal, which includes the following steps.

A data erasing request from a management server is received.

For each erasing range node in an erasable list, it is judged whether a value of a flag bit of the erasing range node indicates deleting data corresponding to the erasing range node.

If the value of a flag bit of the erasing range node indicates deleting data corresponding to the erasing range node, the data corresponding to the erasing range node is deleted.

After the data is successfully deleted, the value of the flag bit of the erasing range node is set to indicate not deleting the data corresponding to the erasing range node.

In an embodiment, the present invention provides a terminal device. The terminal device includes a receiving unit and a data erasing unit.

The receiving unit is configured to receive a data erasing request from a management server.

The data erasing unit is configured to delete data corresponding to each erasing range node according to a value of a flag bit of the erasing range node in an erasable list, after the receiving unit receives the data erasing request, and to delete the erasing range node from the erasable list after successfully deleting the data corresponding to the erasing range node.

In embodiments of the present invention, a data erasing request from a management server is received, data corresponding to each erasing range node is deleted according to a value of a flag bit of the erasing range node in an erasable list, and the erasing range node is deleted from the erasable list after the data corresponding to the erasing range node is successfully deleted. Therefore, the already deleted data is avoided from being repeatedly deleted when the management server re-delivers an erasing request. In this way, the efficiency of executing an erasing operation by a system is improved, and processing resources of the system are saved.

DETAILED DESCRIPTION OF THE EMBODIMENTS

The present invention provides a method for erasing data of a terminal, and further provides a corresponding terminal device, which are described in detail in the following respectively.

Figure 1:
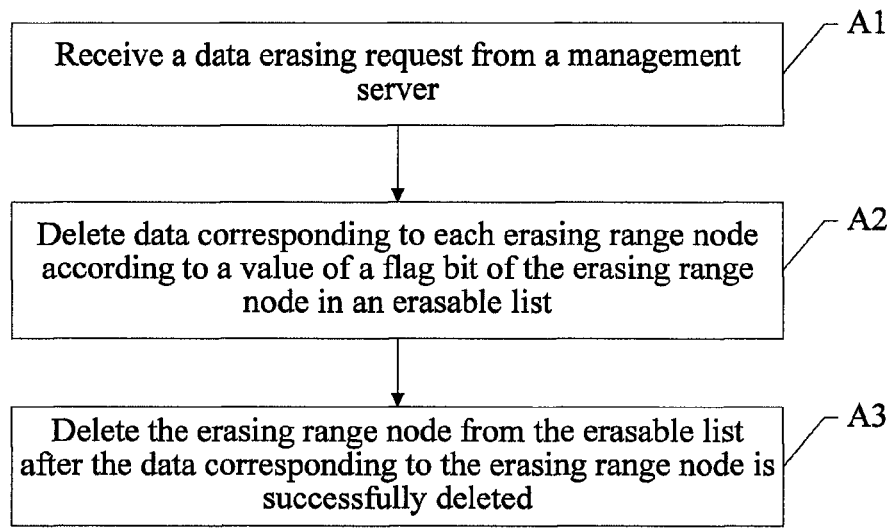
FIG. 1 is a flow chart of a method for erasing data of a terminal according to a first embodiment of the present invention.

In a first embodiment, a method for erasing data of a terminal is provided. A flow chart of the method is shown in FIG. 1, and the method includes the following steps.

In step A1, a data erasing request from a management server is received.

In step A2, data corresponding to each erasing range node is deleted according to a value of a flag bit of the erasing range node in an erasable list.

In the embodiment of the present invention, the erasable list includes the erasing range nodes. The value of the flag bit of the erasing range node is configured to indicate whether deleting the data corresponding to the erasing range node when an erasing operation is executed.

Figure 2:
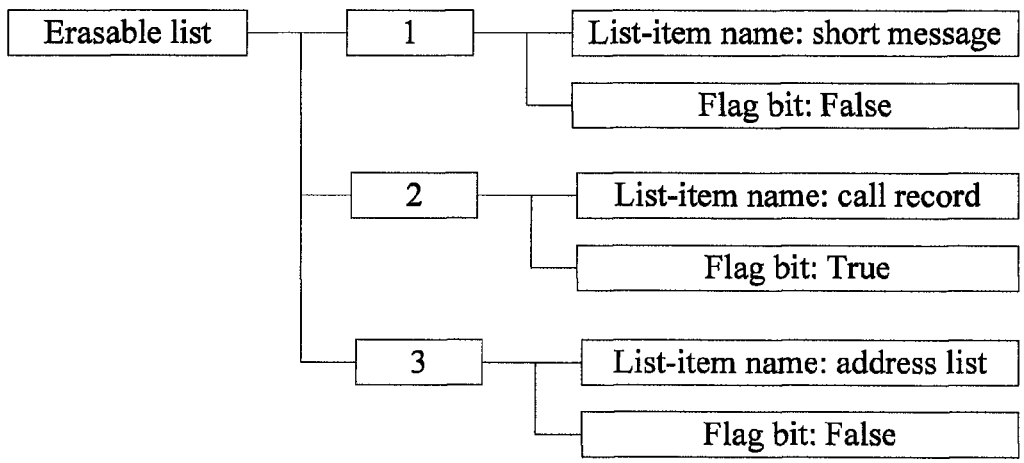
FIG. 2 is a schematic view of an erasable list according to the first embodiment of the present invention.

Referring to FIG. 2, it is a schematic view of the erasable list according to the first embodiment of the present invention.

The erasable list in FIG. 2 includes three erasing range nodes (erasing range nodes 1, 2, and 3), and each erasing range node includes a list-item name and a flag bit. The list-item name represents an erasing range of the node. A value of the flag bit of the erasing range node is configured to represent whether data corresponding to the erasing range of the node is required to be deleted when an erasing operation is executed. As shown in FIG. 2, it can be understood that in this embodiment, the list-item name and the flag bit are represented by sub-nodes of the erasing range node, where short message, call record, and address list may be the value of the list-item name, and "True" or "False" is the value of the flag bit. "True" represents that deletion is required, and "False" represents that deletion is not required. When the erasing operation is executed, data (the call record) corresponding to the erasing range node 2 is deleted.

It can be understood that in this embodiment, "True" and "False" are just an example of identifying whether to delete the data corresponding to erasing range node. It can be understood that "1" and "0" may also be used for representation.

The embodiment of the present invention emphasizes that whether to delete the data corresponding to the erasing range node can be identified by an identifier, but specific identifying methods are not intended to limit the present invention. Further, the flag bit is not limited to a binary "bit", and may be represented in other manners, such as an 8-bit or a 16-bit manner. The specific manners concerning how the value of the erasing node represents whether the deletion is required include many conventional manners, and are not intended to limit the present invention.

In step A3, after the data corresponding to the erasing range node is successfully deleted, the erasing range node is deleted from the erasable list.

Also referring to FIG. 2, "the call record" in the terminal is deleted after the erasing operation is executed. Then in the step, the node "2" in the erasable list is deleted.

Furthermore, no strict time sequence exists between step A2 of deleting the data corresponding to the erasing range node and step A3 of deleting the erasing range node from the erasable list. It is not necessarily that only after the data corresponding to the erasing range node is successfully deleted, the erasing range node is deleted from the erasable list. The erasing range node may also be deleted from the erasable list before the data is deleted. Alternatively, the erasing range node may also be deleted at the same time as the data is deleted.

Furthermore, after the erasing range node is deleted from the erasable list, information indicating that the node is already deleted may be reported to the management server. The reporting may be performed in a Synchronous Result Reporting or an Asynchronous Result Reporting manner. Specifically, a result code may be included in the reporting message, for example, if the result code is 1201, it represents that an erasing range node is already deleted from a management tree during an erasing operation procedure.

In the first embodiment of the present invention, the data erasing request from the management server is received, the data corresponding to the erasing range node is deleted according to the value of the flag bit of the erasing range node in the erasable list, and the erasing range node is deleted from the erasable list after the data corresponding to the erasing range node is successfully deleted. Therefore, the already deleted data is avoided from being repeatedly deleted when the management server re-delivers an erasing request. In this way, the efficiency of executing the erasing operation by the system is improved, and processing resources of the system are saved.

Figure 3:
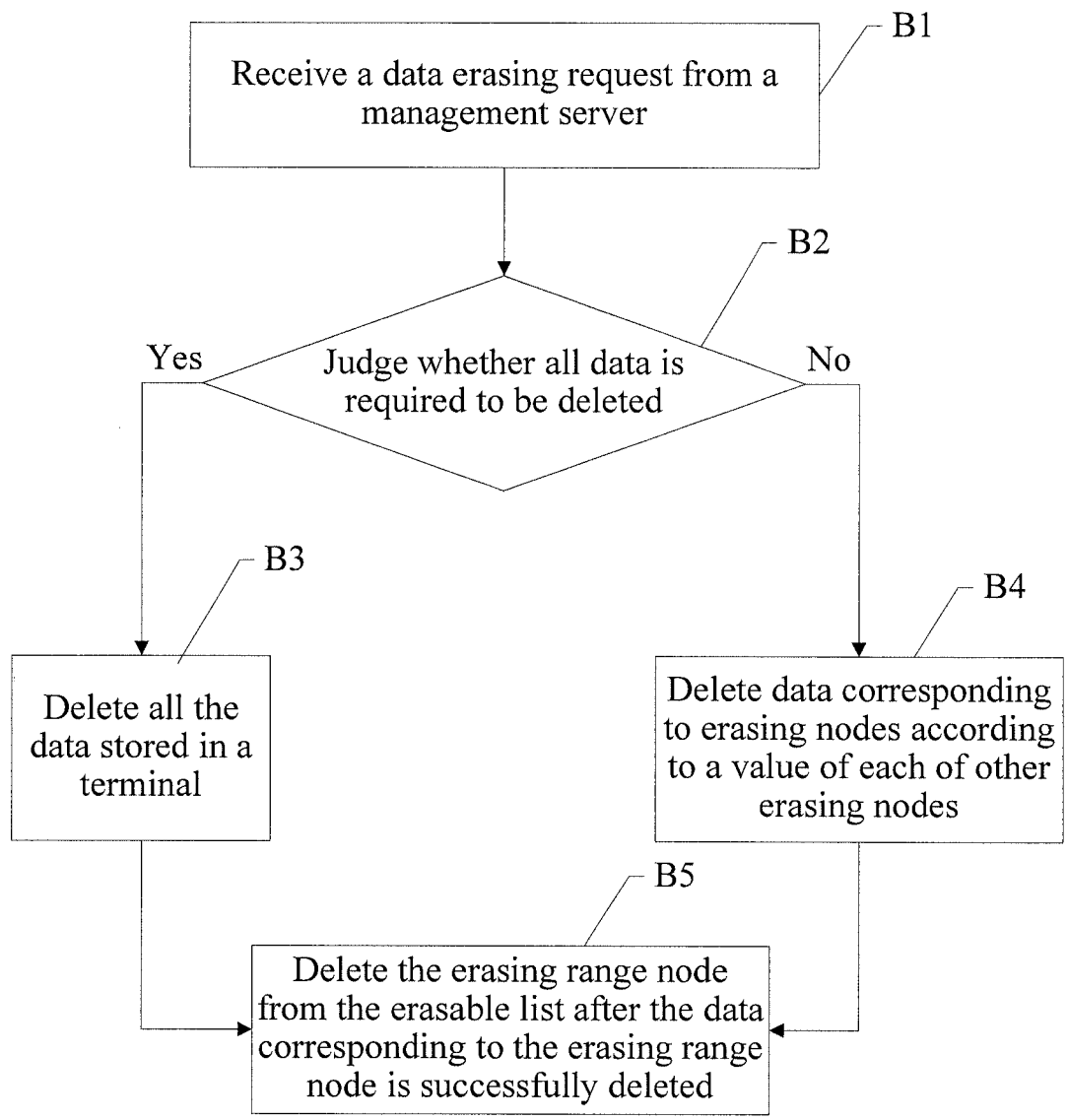
FIG. 3 is a flow chart of a method for erasing data of a terminal according to a second embodiment of the present invention.

In a second embodiment, a method for erasing data of a terminal is provided. A flow chart of the method is shown in FIG. 3, and the method includes the following steps.

In step B1, a data erasing request from a management server is received.

In step B2, it is judged, according to a value of a flag bit of an all erasing node in an erasable list, whether all data is required to be deleted. If it is judged that all data is required to be deleted, step B3 is performed; and if it is judged that not all data is required to be deleted, step B4 is performed.

In the embodiment of the present invention, the all-erasing node is set in the erasable list, and the erasing range corresponding to the node covers all data stored in a terminal.

Figure 4:
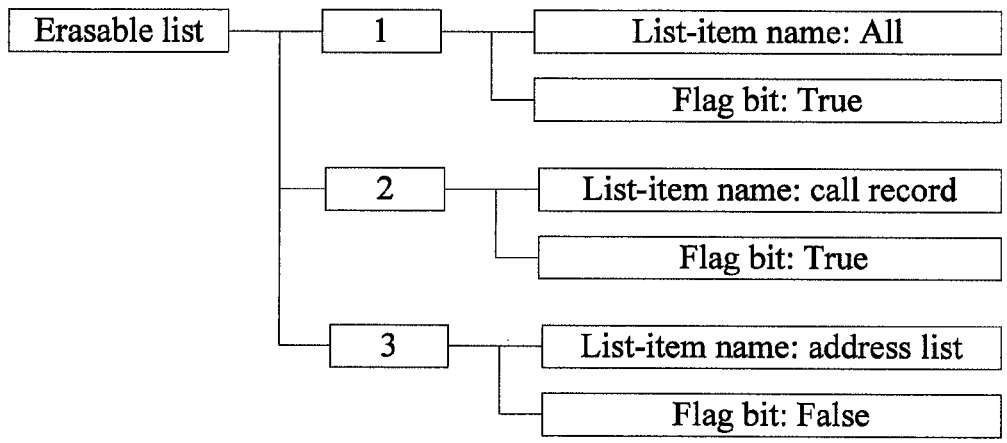
FIG. 4 is a schematic view of an erasable list according to the second embodiment of the present invention.

Referring to FIG. 4, it is a schematic view of the erasable list in the second embodiment of the present invention. The drawing includes a node "1" being the all-erasing node, and a value of a list-item name of the node is "ALL", that is, corresponding to the erasing range covering all data, and if a value of the flag bit is "True", the terminal needs not to judge values of other nodes, and directly erases all the data.

In step B3, all the data stored in the terminal is deleted, and step B5 is performed.

In step B4, data corresponding to erasing nodes is deleted according to a value of each of other erasing nodes, and step B5 is performed.

In this step, for the procedure of deleting the data corresponding to the erasing nodes according to the value of each of other nodes, refer to step A2 in the first embodiment.

In step B5, after the data corresponding to the erasing range node is successfully deleted, the erasing range node is deleted from the erasable list.

According to the second embodiment of the present invention, the all-erasing node is added to the erasable list, and when the data is to be erased, it is judged whether all the data is required to be erased according the value of the all-erasing node first. Compared with the prior art where even when all data is to be erased, the value of the flag bit of the erasing range node is still required to be judged, the method provided in the present invention can greatly improve a data erasing efficiency, shorten data erasing time, and simplify a data erasing process.

It can be understood that step B5 is not a compulsory step in the second embodiment of the present invention, only the execution of the steps from step B1 to step B4 can also achieve the technical results of improving the data erasing efficiency, shortening the data erasing time, and simplifying the data erasing process brought by the erasing of all the data of the terminal through the all erasing node.

Figure 5:
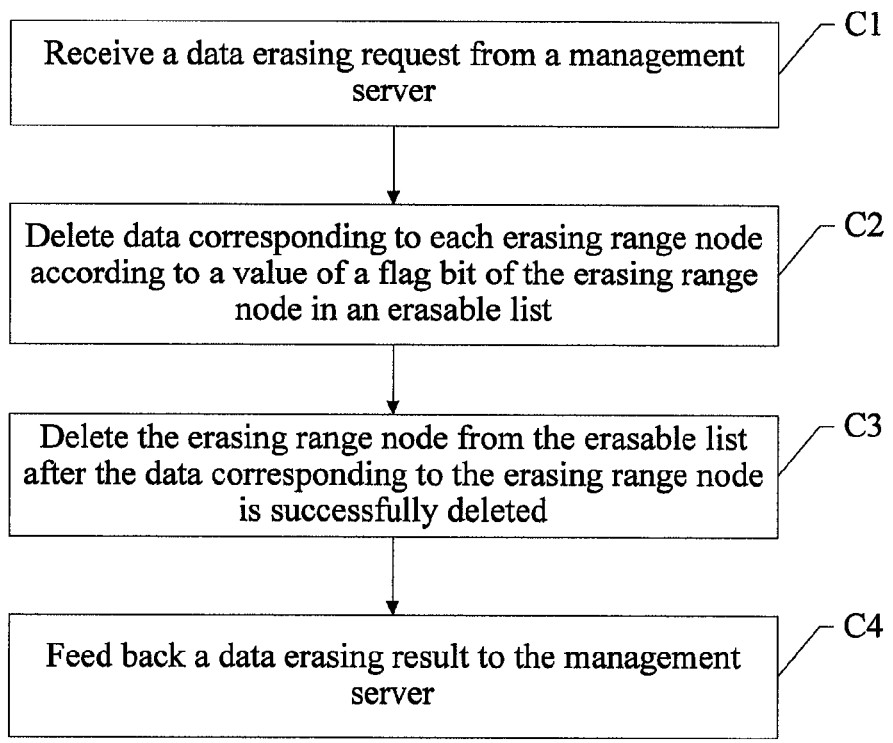
FIG. 5 is a flow chart of a method for erasing data of a terminal according to a third embodiment of the present invention.

In a third embodiment, a method for erasing data of a terminal provided. A flow chart of the method is shown in FIG. 5, and the method includes the following steps.

In step C1, a data erasing request from a management server is received.

In step C2, data corresponding to each erasing range node is deleted according to a value of a flag bit of the erasing range node in an erasable list.

In step C3, after the data corresponding to the erasing range node is successfully deleted, the erasing range node is deleted from the erasable list.

In step C4, a data erasing result is fed back to the management server.

In this embodiment, no absolute time sequence exists between step C3 and step C4, and it is emphasized that the completion of step C2 is also a pre-condition of execution of step C4.

In the embodiment of the present invention, the data erasing result fed back to the management server includes information of the erasing range node corresponding to data being not erased and/or failing to be erased.

It can be understood that the data erasing result fed back to the management server may further include a reason code regarding why the data corresponding to the erasing range node is not erased and/or fails to be erased.

Definitely, the step emphasizes that the management server knows the erasing situation of the terminal data corresponding to the erasing range node through the fed back erasing result, and therefore the data erasing result fed back to the management server may include information of the erasing range node corresponding to the already erased data.

It can be understood that the feedback manner in the specific method for feeding back the erasing result to the server after the data is erased in this embodiment may be a synchronous feedback or an asynchronous feedback manner.

The method in the Synchronous Result Reporting manner is described in the following.

```
<Status>
  <MsgRef>1</MsgRef>
  <CmdRef>2</CmdRef>
  <Cmd>Exec</Cmd> <!-- Reporting of Exec command -->
  <Data>200</Data>       <!-- Operation is executed successfully. -->
  <Item>
  <Source>
    <LocURI>./ WipeMO/Operations/Wipe </LocURI> <!-- Erasing operation is executed. -->
  </Source>
  <Target>
    <LocURI>./ WipeMO/erasable list/1/list-item name</LocURI>   <!-- Short messages are erased. -->
  </Target>
  <Data>short message</Data>
  </Item>
  <Item>
  <Source>
    <LocURI>./ WipeMO/Operations/Wipe </LocURI> <!-- Erasing operation is executed. -->
  </Source>
  <Target>
    <LocURI>./ WipeMO/erasable list/3/list-item name</LocURI>   <!-- Address list is erased. -->
  </Target>
  <Data>address list</Data>
  </Item>
</Status>
```

The above is the reporting to the server when the erasing operation is executed successfully. Besides the code representing that the command is successfully executed, one or more <Item> items are included. A <Source> sub-item of each <Item> includes a Uniformed Resource Identifier (URI) of the erasing operation. A <Target> sub-item includes a URI identifying the erasing range node. A <Data> sub-item is information of the erasing range node.

If data fails to be erased, a terminal independently reports <Status> for the data failing to be erased. Besides a code representing that the command fails to be executed, one or more identifiers of the range of the data failing to be erased are included. For example:

```
<Status>
  <MsgRef>1</MsgRef>
  <CmdRef>2</CmdRef>
  <Cmd>Exec</Cmd><!-- Reporting of Exec command -->
  <Data>500</Data>       <!-- Operation fails.-->
  <Item>
  <Source>
    <LocURI>./ WipeMO/Operations/Wipe </LocURI> <!-- Erasing operation is executed. -->
  </Source>
  <Target>
    <LocURI>./ WipeMO/erasable list/2/list-item name</LocURI>   <!-- Call record is not erased. -->
  </Target>
  <Data>call record</Data>
  </Item>
</Status>
```

The method in the Asynchronous Result Reporting is described in the following.

If the erasing command cannot be completed instantly, the Asynchronous Result Reporting is performed in a generic alert manner. An example is described in the following.

```
<Alert>
    <CmdID>2</CmdID>
    <Data>1226</Data>        <!-- Generic Alert -->
    <Correlator>correlator1</Correlator><!-- Certain executed command is identified.-->
    <Item>
        <Source><LocURI>./ WipeMO/Operations/Wipe
        </LocURI></Source>
        <Target><LocURI>./ WipeMO/erasable list/2/list-item name</LocURI></Target>
        <Meta>
            <Type xmlns="syncml:metinf">
```

Reversed-Domain-Name:org.openmobilealliance.lawmo.OperationComplete

```
        </Type><!-- alert type -->
            <Format xmlns="syncml:metinf">text/plain</Format>
            <Mark xmlns=" syncml:metinf">warning</Mark>
        </Meta>
        <Data>
<![CDATA[
<ResultCode>200</ResultCode>       <!- Result code is successfully erased. -->
<Identifier>call record</Identifier><!-- information of erasing range node -->
]]>
        </Data>
    </Item>
    <Item>
        <Source><LocURI>./ WipeMO/Operations/Wipe
        </LocURI></Source>
        <Target><LocURI>./ WipeMO/erasable list/1/list-item name</LocURI></Target>
        <Meta>
            <Type xmlns="syncml:metinf">
```

Reversed-Domain-Name:org.openmobilealliance.lawmo.OperationComplete

```
        </Type>
            <Format xmlns="syncml:metinf">text/plain</Format>
            <Mark xmlns="syncml:metinf">warning</Mark>
        </Meta>
        <Data>
<![CDATA[
<ResultCode>400</ResultCode>       <!- result code of failed erasing-->
<Identifier>the short messages</Identifier><!-- information of erasing range node -->
]]></Data>
    </Item>
</Alert>
```

One or more <Item> items are used in the message to identify an erasing range and an erasing result. Being similar to the Synchronous Result Reporting, a <Source> sub-item includes a URI of an erasing operation. A <Target> sub-item includes a URI identifying the erasing range node. A <Data>/<Identifier> sub-item includes information of the erasing range node. In addition, <Item> further includes an alert type defined for the erasing operation in the present invention, where the alert type represents that the message is sent for indicating that the erasing operation is completed. <Item> further includes a type of the result code defined in the present invention, for example, 400 represents that the erasing operation fails, and other result codes can be configured to represent more detailed erasing results, for example, 401 represents that the erasing operation fails because the data is being used, and 402 represents that the data to be erased is not found. More codes may be available, and are not limited in the present invention.

No matter the Synchronous Result Reporting or the Asynchronous Result Reporting manner is adopted, when all the data is erased, multiple reporting manners may be available. In a first manner, only information of whether all the data is successfully erased or fails to be erased is reported (that is, the erasing range is identified as All in the reporting). In a second manner, information of the erasing range node being not erased and/or failing to be erased is fed back to the server. In a third manner, information of already erased erasing range node is fed back to the server. The described manners can be used in a combined manner.

The difference between the third embodiment of the present invention and the prior art is described in the following. In the prior art, a terminal feeds back information indicating that the erasing operation is successful executed or fails to a server after executing an erasing command. The feedback manner is more general, and cannot reflect the specific situation of the data erasing. In this embodiment, the management server can specifically know which node is successfully erased, which node fails to be erased, and the reasons of the failures, through the feedback of the specific data erasing situation of each node, which helps the setting of a corresponding erasing range when the management server performs the erasing operation next time.

It can be understood that the method for feeding back the erasing result in this third embodiment is also applicable to the second embodiment, that is, steps C1 to C3 may also be replaced by the steps B1 to B5 in the second embodiment. This embodiment does not include step C3, and only the execution of steps C1, C2, and C4 can also achieve the beneficial effects brought by the feedback of the erasing result in this embodiment.

In the embodiment of the present invention, based on the method from the first to the third embodiments, the method further includes recording a state of the erasing range node in an erasable list.

The state of the erasing node in the erasable list includes that no erasing range node is generated, the erasing range node is already generated, and the relevant node is already deleted.

Specifically, in order to make the server know the states of the erasing range node and the data erasing operation, a WipeState (erasing state) node is defined in the present invention, and the WipeState node may be stored anywhere in a Lock and Wipe Management Object (LAWMO). The WipeState node identifies different erasing states, and specific states and meanings thereof are shown in the table in the following.

| Node value | State | Description |
| --- | --- | --- |
| 10 | No erasing range node is generated. | No erasing range node is generated for data in a terminal yet. |
| 20 | An erasing range node is generated. | The Erasing range node is already generated for data in a terminal. |
| 30 | The relevant node is deleted. | The erasing range node is already generated, and after data in a terminal is erased, the corresponding node is already deleted. |

In the table, the state "an relevant node is deleted" means that the data in the terminal is corresponding to the erasing range node.

When the WipeState node is generated in the terminal, an initial value is assigned to the node, and the value may be one of 10, 20, and 30.

It can be understood that before the step of receiving the data erasing request from the management server, the method from the first to the third embodiments includes generating the erasing range node in the erasable list.

The step of recording the state of the erasing range node in the erasable list includes the following steps.

Before the erasing range node is generated in the erasable list, the state of the erasing range node is recorded as "no erasing range node is generated".

After the erasing range node is generated in the erasable list, the state of the erasing range node is recorded as "an erasing range node is generated".

After the erasing range node is deleted from the erasable list, the method further includes recording the state of the erasing range node as "the relevant node is already deleted".

When the state of the erasing range node in the terminal is changed, the value of the node should be changed accordingly, and the value may be set by the terminal or the server.

When the server is required to operate the data in the terminal, the value of the node may be obtained first, so that the state information of the erasing range node and the existence of the data in the terminal is obtained, and then the next operation is performed.

It can be understood that the state of the erasing node may be other states according to system requirements. The specific setting of state is not intended to limit the present invention. It is emphasized here that the terminal may record multiple states for the erasing node, so as to provide feedback for the management server or accept queries from the management server, so that the management server can obtain more information about the terminal.

It can be understood that the solution that the terminal records multiple states for the erasing node does not depend on the technical solutions from the first to the third embodiments. When the prior art is combined, the management server may also obtain more information of the terminal.

Figure 6:
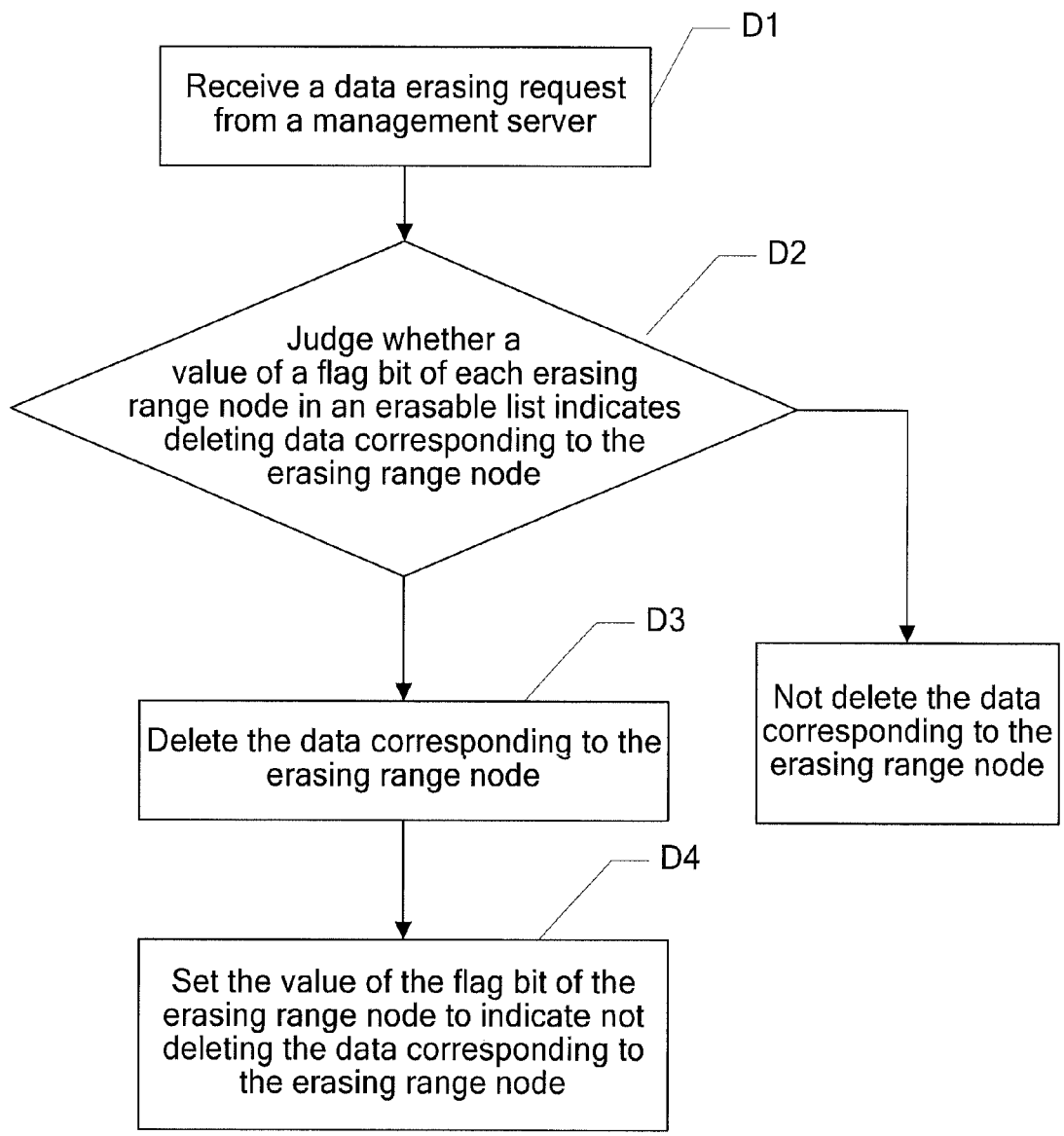
FIG. 6 is a flow chart of a method for erasing data of a terminal according to a fourth embodiment of the present invention.

In a fourth embodiment, a method for erasing data of a terminal is provided. A flow chart of the method is shown in FIG. 6, and the method includes the following steps.

In step D1, a data erasing request from a management server is received.

In step D2, for each erasing range node in an erasable list, it is judged whether a value of a flag bit of the erasing range node indicates deleting data corresponding to the erasing range node. If it is judged that a value of a flag bit of the erasing range node indicates deleting data corresponding to the erasing range node, step D3 is performed; if it is judged that a value of a flag bit of the erasing range node indicates not deleting data corresponding to the erasing range node, the data corresponding to the erasing range node is not deleted.

In step D3, the data corresponding to the erasing range node is deleted, and step D4 is performed.

In step D4, the value of the flag bit of the erasing range node is set to indicate not deleting the data corresponding to the erasing range node.

Referring to FIG. 2, a schematic view of an erasable list, in the figure, for the value of the erasing range node, "True" indicates deleting the data corresponding to the erasing range node, and "False" indicates not deleting the data. The step emphasizes that after the data is deleted, the value changes from "True" to "False". It can be understood that in this embodiment, "True" and "False" are just an example of identifying whether to delete the data of the erasing range node. It can be understood that "1" and "0" may also be used for representation. The embodiment of the present invention emphasizes that whether to delete the data corresponding to the erasing range node can be identified by an identifier, but specific identifying methods are not intended to limit the present invention. Further, the flag bit is not limited to a binary "bit", and may be represented in other manners, such as an 8-bit or a 16-bit manner.

It can be understood that after step D4, the method may further include feeding back a data erasing result to the management server.

The data erasing result fed back to the management server includes information of the erasing range node corresponding to the data being not erased and/or failing to be erased; or information of the erasing range node corresponding to the already erased data.

In the fourth embodiment, after the data is successfully deleted, the value of the flag bit of the erasing range node is set to indicate not deleting the data corresponding to the erasing range node. Therefore, the already deleted data is avoided from being repeatedly deleted when the management server re-delivers an erasing request. In this way, the efficiency of executing the erasing operation by the system is improved, and processing resources of the system are saved.

Those of ordinary skill in the art can understand that all or a part of the steps of the method according to the embodiments of the present invention may be implemented by a program instructing relevant hardware. The program may be stored in a computer readable storage medium. The storage medium may include a ROM, a RAM, a magnetic disk, and an optical disk.

A terminal device provided by the present invention is described in detail in the following.

Figure 7:
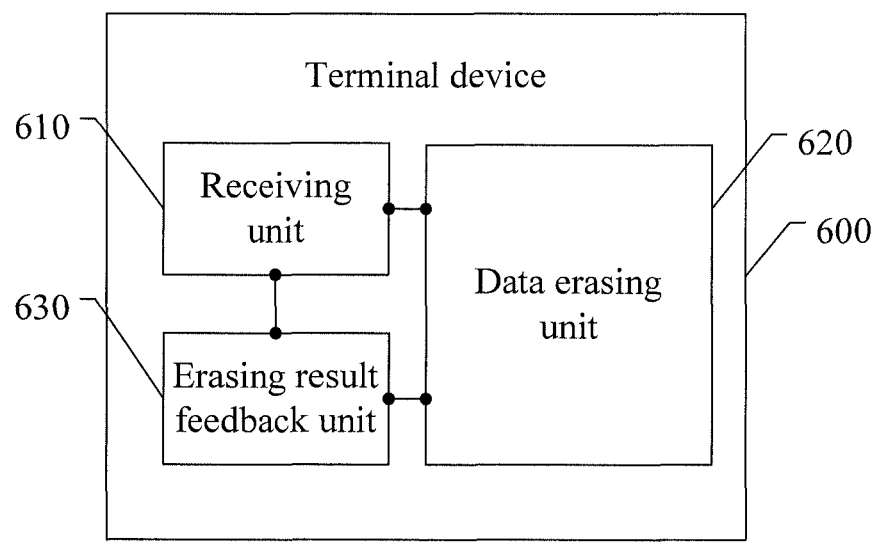
FIG. 7 is a schematic view of a logical structure of a terminal device according to a fifth embodiment of the present invention.

In a fifth embodiment, a terminal device 600 is provided. A logical structure of the terminal device 600 is shown in FIG. 7. The terminal device 600 includes a receiving unit 610 and a data erasing unit 620.

The receiving unit 610 is configured to receive a data erasing request from a management server.

The data erasing unit 620 is configured to delete data corresponding to each erasing range node according to a value of a flag bit of the erasing range node in an erasable list after the receiving unit 610 receives the data erasing request, and to delete the erasing range node from the erasable list after successfully deleting the data corresponding to the erasing range node.

The terminal device in this embodiment may further include an erasing result feedback unit 630 configured to feed back a data erasing result to the management server, where the data erasing result includes the erasing range node corresponding to data being not erased and/or failing to be erased.

It can be understood that the terminal device in this embodiment may further include a state recording unit configured to record a state of the erasing range node in the erasable list.

The method for erasing the data of the terminal and the terminal device according to the embodiments of the present invention are described above in detail.

In an embodiment of the present invention, the data erasing request from the management server is received, the data corresponding to the erasing range node is deleted according to the value of the flag bit of the erasing range node in the erasable list, and the erasing range node is deleted from the erasable list after the data corresponding to the erasing range node is successfully deleted. Therefore, the already deleted data is avoided from being repeatedly deleted when the management server re-delivers the erasing request. In this way, the efficiency of executing the erasing operation by the system is improved, and the processing resources of the system are saved.

In another embodiment of the present invention, the all erasing node is added to the erasable list, and when the data is to be erased, it is first judged, according the value of the all erasing node, whether all the data is required to be erased. Compared with the prior art where even when all data is to be erased, the value of the flag bit of the erasing range node is still required to be judged, the method provided in the present invention can greatly improve the data erasing efficiency, shorten the data erasing time, and simplify the data erasing process.

In still another embodiment of the present invention, the management server can specifically know which node is successfully erased, which node fails to be erased, and the reasons of the failures, through the feedback of the specific data erasing situation of each node, which helps the setting of the corresponding erasing range when the management server performs the erasing operation next time.

The principle and implementation of the present invention are described herein through specific examples. The description of the embodiments is merely provided for ease of understanding of the method and core ideas of the present invention. Person having ordinary skill in the art can make variations and modifications to the present invention in terms of the specific implementations and application scopes according to the ideas of the present invention. Therefore, the specification shall not be construed as limitations to the present invention.

What is claimed is:

1. A method for erasing data stored in a terminal device by the terminal device, comprising:
   receiving a data erasing request from a management server;
   identifying an erasing range node in an erasable list and data corresponding to the erasing range node;
   if, in the erasable list, a flag bit associated with the erasing range node indicates that the data corresponding to the erasing node are to be deleted, deleting the data corresponding to the erasing range node; and
   after the data corresponding to the erasing range node are deleted, deleting the erasing range node from the erasable list.

2. The method according to claim 1, wherein before the deleting the erasing range node from the erasable list, the method further comprises:
   confirming that the data corresponding to the erasing range node is successfully deleted.

3. The method according to claim 2, further comprising recording a state of the erasing range node in the erasable list.

4. The method according to claim 3, wherein the recording the state of the erasing range node in the erasable list comprises:
   after deleting the erasing range node from the erasable list, recording the state of the erasing range node as "the erasing range node is deleted".

5. The method according to claim 3, wherein before receiving the data erasing request from the management server, the method further comprises:
   generating the erasing range node in the erasable list;
   and wherein recording the state of the erasing range node in the erasable list comprises:
   before generating the erasing range node in the erasable list, recording the state of the erasing range node as "no erasing range node is generated"; and
   after generating the erasing range node in the erasable list, recording the state of the erasing range node as "an erasing range node is generated".

6. The method according to claim 2, wherein the flag bit is represented by a sub-node of the erasing range node.

7. The method according to claim 1, wherein after deleting the data corresponding to the erasing range node if the flag bit associated with the erasing range node indicates that the data corresponding to the erasing node are to be deleted, the method further comprises:
   feeding back a data erasing result to the management server.

8. The method according to claim 7, wherein the data erasing result fed back to the management server comprises one of:
   information of the erasing range node corresponding to at least one of: the data being not erased and the data failing to be erased, and
   information of the erasing range node corresponding to the already erased data.

9. The method according to claim 8, wherein the data erasing result fed back to the management server further comprises:
   a reason code regarding why the data corresponding to the erasing range node is not erased or fails to be erased.

10. The method according to claim 1, wherein after the deleting the erasing range node from the erasable list, the method further comprises:
    reporting information that the erasing range node is already deleted to the management server.

11. The method according to claim 1, wherein the flag bit is represented by a sub-node of the erasing range node.

12. A terminal device in communication with a management server in a communication network, comprising:
    a receiver, configured to receive a data erasing request from the management server; and
    a processing unit, configured to identify an erasing range node in an erasable list and data corresponding to the erasing range node; delete data corresponding to the erasing range node if, in the erasable list, a flag bit associated with the erasing range node indicates that the data corresponding to the erasing node are to be deleted; and, after the data corresponding to the erasing range node are deleted, delete the erasing range node from the erasable list.

13. The terminal device according to claim 12, wherein the processing unit is further configured to record a state of the erasing range node in the erasable list.

14. The terminal device according to claim 12, further comprising a transmitter, configured to feed back a data erasing result to the management server, wherein the data erasing result comprises one of:
    information of the erasing range node corresponding to at least one of: the data being not erased and the data failing to be erased, and
    information of the erasing range node corresponding to the already erased data.

15. A method for erasing data stored in a terminal device by the terminal device, comprising:
    receiving a data erasing request from a management server;
    identifying an all-erasing node in an erasable list; wherein the erasable list comprises the all-erasing node and at least one erasing range node;
    if, in the erasable list, a flag bit associated with the all-erasing range node indicates that all data in the terminal device are required to be deleted, deleting all data stored in the terminal device; or if the flag bit associated with the all-erasing range node indicates that not all the data stored in the terminal device are required to be deleted, the method further comprising:
- identifying an erasing range node among the at least one erasing range node in the erasable list and data corresponding to the erasing range node;
- if, in the erasable list, a flag bit associated with the erasing range node indicates that the data corresponding to the erasing node are to be deleted, deleting the data corresponding to the erasing range node; and
- after the data corresponding to the erasing range node are deleted, deleting the erasing range node from the erasable list.

16. A terminal device in communication with a management server in a communication network, comprising:
- a receiver, configured to receive a data erasing request from a management server;
- a processing unit, configured to:
- identify an all-erasing node in an erasable list; wherein the erasable list comprises the all-erasing node and at least one erasing range node;
- if, in the erasable list, a flag bit associated with the all-erasing range node indicates that all data in the terminal device are required to be deleted, delete all data stored in the terminal device; or
- if, in the erasable list, a flag bit associated with the erasing range node indicates that the data corresponding to the erasing node are to be deleted, delete the data corresponding to the erasing range node; and
- after the data corresponding to the erasing range node are deleted, delete the erasing range node from the erasable list.

* * * * *